United States Patent
Obkircher

Patent Number: 5,964,432
Date of Patent: Oct. 12, 1999

[54] SYSTEM FOR SEARCHING FOR, DETECTING AND TRACKING FLYING TARGETS

[75] Inventor: Bernt Obkircher, Horgenzell, Germany

[73] Assignee: Dornier GmbH LHG, Germany

[21] Appl. No.: 08/934,598

[22] Filed: Sep. 22, 1997

Related U.S. Application Data

[63] Continuation of application No. PCT/DE97/00064, Jan. 20, 1996.

[51] Int. Cl.⁶ ................................ F41G 7/00; F41G 5/06
[52] U.S. Cl. ........................................ 244/3.16; 89/41.05
[58] Field of Search ................................. 244/3.16, 3.15; 356/153; 250/332, 334, 339.14, 342; 89/1.11, 41.05

[56] References Cited

U.S. PATENT DOCUMENTS

| | | | |
|---|---|---|---|
| 3,729,152 | 4/1973 | Stephenson | 244/3.16 |
| 4,324,491 | 4/1982 | Hueber | 244/3.16 |
| 4,383,663 | 5/1983 | Nichols | 244/3.16 |
| 4,386,848 | 6/1983 | Clendenin et al. | 244/3.16 |
| 4,407,464 | 10/1983 | Linick | 244/3.13 |
| 4,690,351 | 9/1987 | Beckerleg et al. | 244/3.16 |
| 4,878,752 | 11/1989 | Bramley | 89/41.05 |
| 4,885,977 | 12/1989 | Kirson et al. | 89/41.05 |
| 4,983,837 | 1/1991 | Cooper et al. | 250/334 |
| 5,005,213 | 4/1991 | Hanson et al. | 89/41.05 |
| 5,091,637 | 2/1992 | Edwards | 244/3.16 |
| 5,103,713 | 4/1992 | Loving | |
| 5,201,895 | 4/1993 | Grosso | 244/3.16 |
| 5,262,630 | 11/1993 | Kordulla | 244/3.16 |
| 5,432,546 | 7/1995 | Cargill | 89/41.05 |

FOREIGN PATENT DOCUMENTS

| | | | |
|---|---|---|---|
| 0 276 099 | 1/1988 | European Pat. Off. | |
| 0 260 191 | 3/1988 | European Pat. Off. | |
| 38 08 803 C1 | 8/1991 | Germany | |
| 37 33 681 C1 | 7/1994 | Germany | |
| WO 93/01465 | 1/1993 | WIPO | |
| 97/26550 A2 | 7/1997 | WIPO | 244/3.16 |
| 97/26550 A3 | 10/1997 | WIPO | 244/3.16 |

Primary Examiner—Charles T. Jordan
Assistant Examiner—Theresa M. Wesson
Attorney, Agent, or Firm—Evenson, McKeown, Edwards & Lenahan, P.L.L.C.

[57] ABSTRACT

An infrared seeker head for a missile includes a viewing lens system and a focal plane array on which the visual field of the lens system is focussed. The image acquired by the focal plane array is displayed on a video display unit. Mounted on the missile launch tube in the beam path of the seeker head viewing lens system is a wide angle lens, which can be retracted to remove it from the seeker head beam path. The wide angle lens enables the gunner to view a large visual field initially. Then, when a "suspicious" object is detected, it can be removed to allow a positive identification of the type of target. A pair of rotating optical wedges are disposed in the beam path of the seeker head, so that its relatively smaller visual field can be diverted to compensate for maneuvering of the target.

7 Claims, 2 Drawing Sheets

SYSTEM FOR SEARCHING FOR, DETECTING AND TRACKING FLYING TARGETS

This application is a continuation of PCT Application No. PCT/DE97/00064 filed on Jan. 20, 1996.

BACKGROUND AND SUMMARY OF THE INVENTION

The invention relates to an infrared seeker head for a missile, and to an infrared optical device on a launcher tube for the missile, for combatting flying targets.

Infrared (IR) seeker heads are known for man portable air defense systems or air-to-air missiles, in which the flying targets must be detected by the gunner's eyes—with or without the assistance of visual aids or heat imaging apparatuses. In such weapons the whole missile with the seeker head must be visually aligned with the target so that the target is in the visual field of the seeker head, which measures only a few degrees. When the seeker head is locked onto the target assigned to it in this manner, the combat operation can start.

It is a disadvantage of such seeker heads that the gunner must visually detect the target with his eyes, because this requirement results in very short detection distances, which are even lower when the visibility is poor. Generally, there is no night combat capability at all. Even if a heat image apparatus is available to the gunner, it is difficult to align the missile so that the seeker head also has the target within the small visual field, because of the parallax problem.

Seeker heads are also known in which the visual field is set by means of a relatively smaller instantaneous visual field which scans the whole visual field. These seeker heads have the disadvantage that they can implement relatively short lock-on distances because the radiation of the target falls onto the detector or the detector array in only a fraction of the time—specifically when sweeping over the target.

Scanning seeker heads of the above-mentioned type are also known which use certain logic in the target tracking operation in order to avoid being deflected from the target by false infrared targets, such as flares. However, newly developed flares, and/or the quantity of the flares which are ejected simultaneously (or in short succession), can cause such logic to fail so that the seeker head is deflected from the real target.

It is an object of the invention to provide a seeker head which can detect flying targets at large distances, at night and in poor visibility.

Another object of the invention is to provide a seeker head which can identify the type of flying target at long distances.

Still another object of the invention is to provide a seeker head which can lock onto flying targets for long distances, which cannot be deflected by false IR targets.

These and other objects and advantages are achieved by the optical system according to the invention, in which the missile itself has an infrared seeker head which includes a viewing lens system and a focal plane array on which the visual field of the lens system is focussed. The image acquired by the focal plane array is displayed on a video display unit. Mounted on the missile launch tube in the beam path of the seeker head viewing lens system is a wide angle lens, which can be retracted to remove it from the seeker head beam path. The wide angle lens enables the gunner to view a large visual field initially. Then, when a "suspicious" object is detected, it can be removed out of the beam path after moving the missile in the direction of this object to allow a positive identification of the type of target. A pair of rotating optical wedges are disposed in the beam path of the seeker head, so that its relatively smaller visual field can be diverted to compensate for maneuvering of the target.

Other objects, advantages and novel features of the present invention will become apparent from the following detailed description of the invention when considered in conjunction with the accompanying drawings.

DETAILED DESCRIPTION OF THE DRAWINGS

Figure 1:
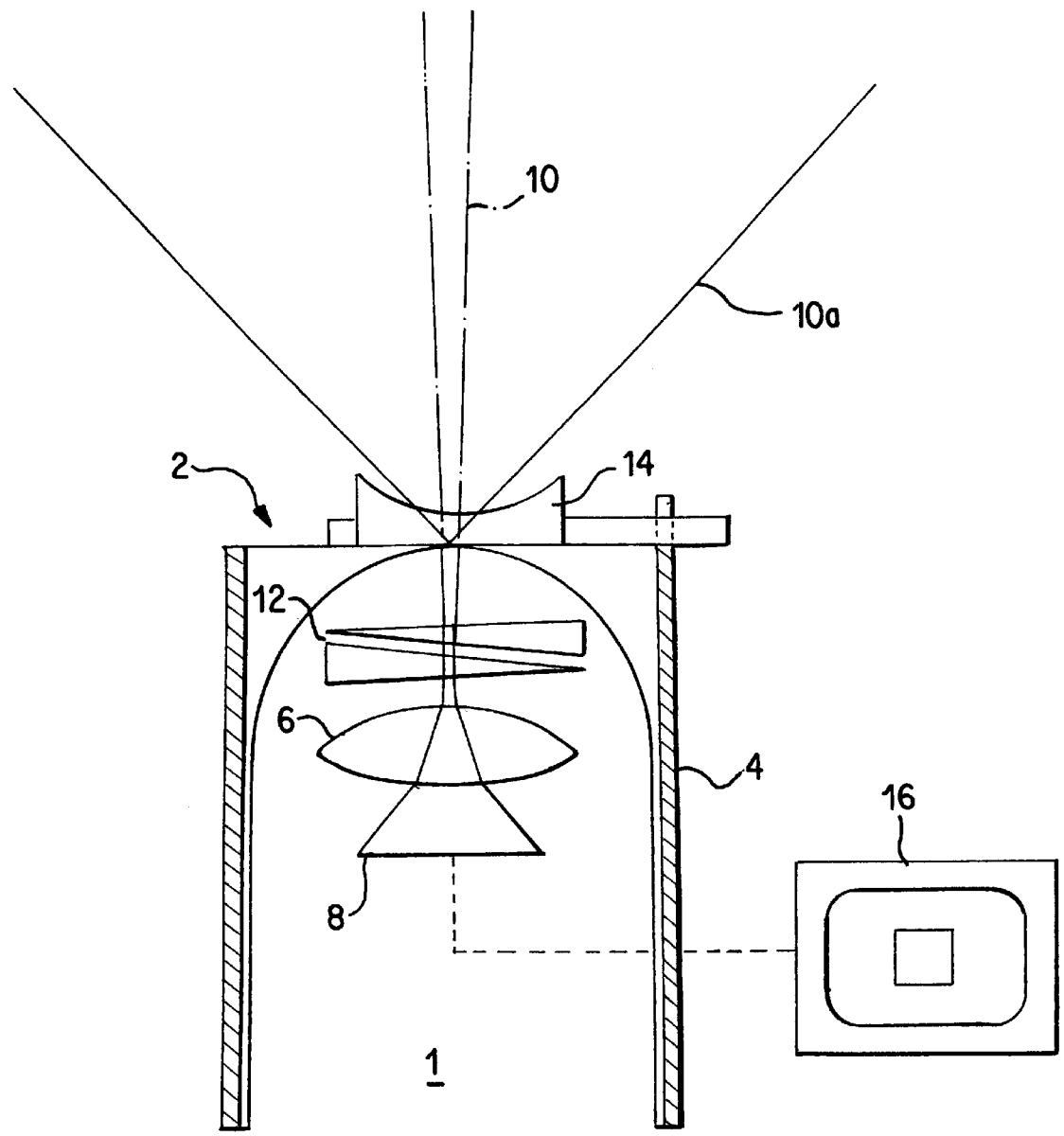
FIG. 1 shows a schematic depiction of the infrared seeker system according to the invention.

The object of the invention relates to two main components in the actual seeker head 2, and one main component on the launcher tube 4: One main component of the seeker head 2 consists of a fixedly installed detector array 8 with a viewing lens system 6 (focal plane array=FPA), both of which operate in the wavelength range of 3.0–5.0 $\mu$m or a partial range thereof. This lens system images the whole visual field 10 of the seeker head 2 of a few degrees on the detector array 8. The other main component of the seeker head 2 is a pair of rotating wedges 12 which, in the case of faster and/or rapidly maneuvering targets, provides the visual field 10 of the seeker head during the flight of the missile 1 with a high squint angle by corresponding rotating positions.

Figure 2:
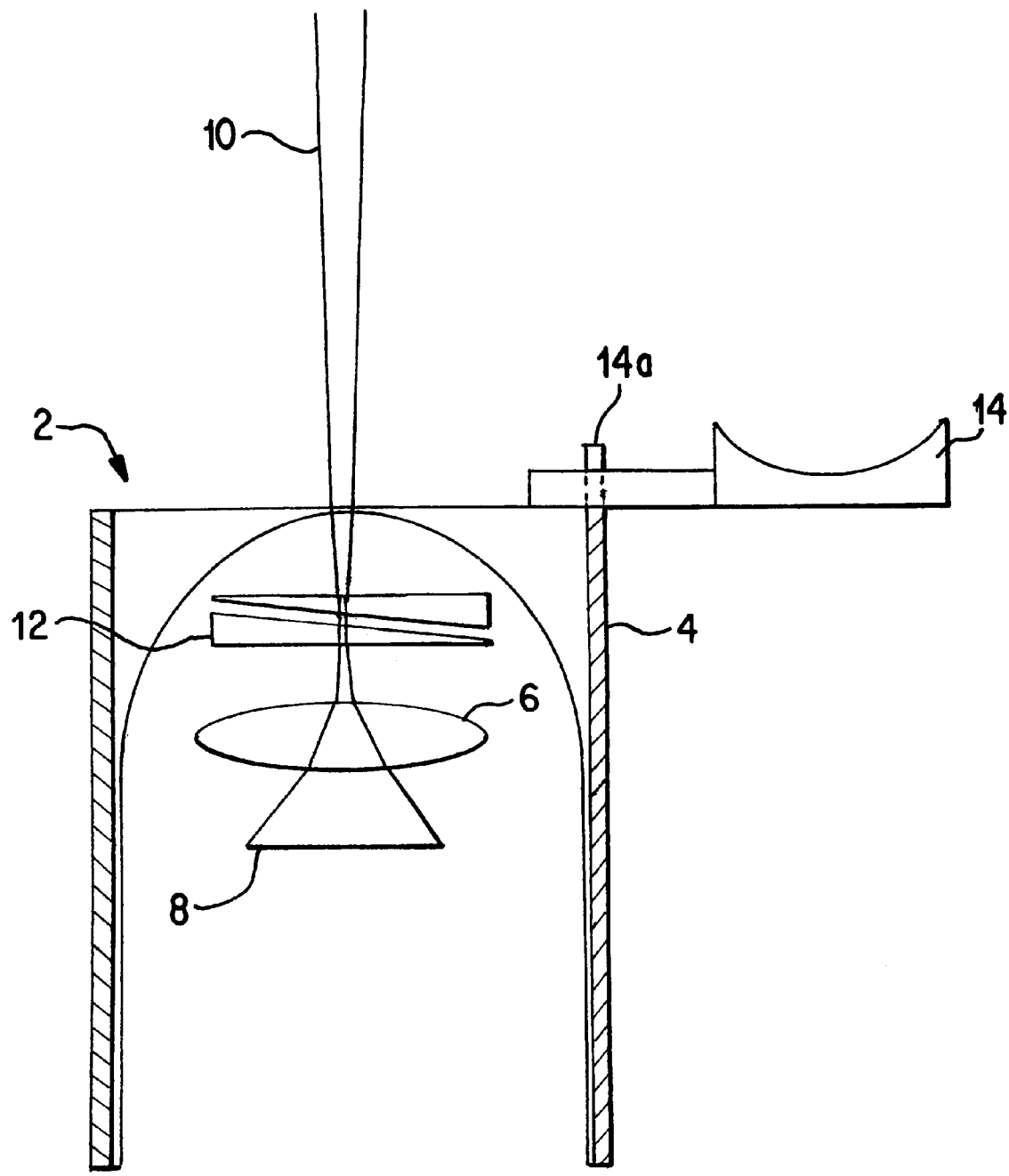
FIG. 2 is a view of the optical apparatus of FIG. 1, with the wide angle lens rotated out of the beam path.

The main component which is mounted on the launcher tube 4 consists of a wide angle lens system 14 disposed directly in front of the seeker head 2 of the missile 1, which wide angle lens system can be moved into and out of the beam path, for example, by turning or rotating it about a pivot axis 14a. FIG. 2 is a view of the optical portion of FIG. 1, with the wide angle lens rotated out of the beam path 10.

By means of these main components, the detection and combatting of flying targets takes place as follows: When searching for a target, the gunner looks at a video display unit or into an eyepiece 16, which is connected to the detector array 8, and, on which there is displayed the IR image which the seeker head 2 itself "sees" by means of its lens system 6 and the front lens system 14. That is, the gunner virtually looks through the seeker head. As a result, he can monitor a large solid angle areas 10a in the IR image and can thus detect flying targets even with poor visibility and at night, and at large distances.

When the gunner has detected a suspicious object which at first is displayed only as a small light point, he moves the missile in the direction of this object until it is situated within a central (for example, faded-in) marking which indicates the visual field 10 of the seeker head 2 without the front (wide angle) lens system 14. Then the gunner folds or rotates the front lens system 14 out of the beam path, so that he now sees the considerably enlarged target in the eyepiece 16, in which the whole image (displayed visual field) now corresponds to the small visual field 10 of the seeker head. In the case of a sufficiently large pixel number in the detector array, which amounts to at least $256^2$, the gunner, even at relatively large target distances, can now recognize the target type (aircraft type, helicopter type) because it is already imaged on a sufficient number of pixels. If the gunner has then made the decision to combat, he simply operates a switch (not shown), whereby the IR image of the aircraft/helicopter is assigned to the seeker head as the target.

Starting at this moment, the seeker head "memorizes" the image pattern of the target and the missile 1 is launched out of the launcher tube 4, penetrating, for example, an IR window. Each new image of the target which is taken in the seeker head 2 is compared with the preceding image and the already known image pattern of the target is updated corresponding to the aspect angle changes. By means of this type of image pattern processing, the seeker head 9 tracks the IR image of the target; and unlike known flare recognition logics, IR radiators, such as flares, which, in addition, appear in the image, cannot divert it since these do not correspond to the correct image pattern. As a result, an absolute resistance of the seeker head to disturbances is possible as early as from the start of the missile 1.

If, during the flight of the missile, the target moves to the edge of the field of vision, a corresponding rotation of the two rotating wedges 12 in the seeker head 2, deflects the beam path so that the target moves back to the center of the image. Thus, high "squint angles" can be implemented.

By means of this device and this process, targets which currently would not be combatible with a missile and an IR seeker head can be detected at large distances in large solid angle ranges, in poor visibility and at night, without any parallax problems. Also, by means of the focal plane array technique, large lock-on distances can be implemented because the target is continuously imaged on detector material and not only for a fraction of time as in the case of scanning seeker heads. By virtue of the high angular resolution, an approaching aircraft can be recognized before the launching of the missile, so that this system may be considered as a passive friend-foe recognition—at least as far as the type of the flying target is concerned.

On the one hand, the image pattern processing permits a high resistance to disturbances. On the other hand, as it continues to approach the target, the missile can precisely select the point of aim at the aircraft, for example, by means of an "on-board library", and thus can achieve a particularly high effect by impacting on a particularly sensitive point of the aircraft.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A missile system comprising:
   an optical seeker head having a viewing lens system, and a detector array positioned to receive an optical image from said viewing lens system;
   a video display unit coupled to said detector array, for displaying said optical image; and
   a wide angle lens element removably disposed in a visual field of said viewing lens system.

2. An optical detection system for a missile, comprising:
   an optical seeker head having a viewing lens system, and a detector array positioned to receive an optical image from said viewing lens system;
   a video display unit coupled to said detector array, for displaying said optical image; and
   a wide angle lens element removably disposed in a visual field of said viewing lens system;
   wherein said wide angle lens is mounted on a launching tube of said missile.

3. Optical detection system according to claim 2 wherein said optical seeker head is an infrared seeker head.

4. Optical detection system according to claim 2 wherein said seeker head further comprises:
   a pair of rotatable wedge shaped optical elements disposed in a beam path of said viewing lens system for deflecting a visual field of said viewing lens system during flight of said missile.

5. A missile system having an optical detection system, comprising:
   an optical seeker head having a viewing lens system, and a detector array positioned to receive an optical image from said viewing lens system;
   a video display unit coupled to said detector array, for displaying said optical image; and
   a wide angle lens element mounted on a launching tube of said missile, and removably disposed in a beam path of said viewing lens system.

6. Missile system according to claim 5 wherein said optical seeker head is an infrared seeker head.

7. A launching apparatus for a missile having an optical viewing system for targeting and guiding said missile, comprising:
   a launching tube for receiving and containing said missile; and
   a wide angle lens system mounted on said launching tube and disposed in a visual field of said optical viewing system;
   means for moving said wide angle lens out of said visual field of said optical viewing system.

* * * * *